United States Patent [19]

Oh

[11] Patent Number: 5,373,394
[45] Date of Patent: Dec. 13, 1994

[54] PROJECTION LENS SYSTEM FOR A VIDEO PROJECTOR

[75] Inventor: Jung-il Oh, Suwon, Rep. of Korea

[73] Assignee: Samsung Electronics Co., Ltd., Kyungki-Do, Rep. of Korea

[21] Appl. No.: 999,135

[22] Filed: Dec. 31, 1992

[30] Foreign Application Priority Data

Feb. 22, 1992 [KR] Rep. of Korea .............. 92-2765

[51] Int. Cl.$^5$ .......................... G02B 3/00; H04N 9/31
[52] U.S. Cl. ................................ 359/634; 359/629; 359/649; 359/650; 359/651; 359/665
[58] Field of Search .............. 359/629, 648, 649, 634, 359/665, 650, 651; 358/60, 64

[56] References Cited

U.S. PATENT DOCUMENTS

| | | | |
|---|---|---|---|
| 4,950,062 | 8/1990 | Kimura et al. | 350/432 |
| 5,066,114 | 11/1991 | Hodges | 359/665 |
| 5,168,351 | 12/1992 | Bradley et al. | 358/60 |

Primary Examiner—Eugene R. LaRoche
Assistant Examiner—Huan Hoang
Attorney, Agent, or Firm—Sughrue, Mion, Zinn, Macpeak & Seas

[57] ABSTRACT

A projection lens system for a video projector for projecting a color image which is generated by combining red, green and blue images from an image source on a large screen. One lens element of a four lens optical lens system is disposed between an image-generating surface (or CRT) and an image combining unit for combining the images, and an oil chamber is provided by sealing the edges of the lens element and the image-generating surface. The flattening of the CRT's image-generating surface and a large aperture are attained by allowing the one lens to correct field curvature aberration and the other lenses to correct coma aberration. Separate cooling for respective CRTs enhances cooling devices efficiency and facilitates CRT movement adjustment for correcting chromatic aberration.

4 Claims, 6 Drawing Sheets

PROJECTION LENS SYSTEM FOR A VIDEO PROJECTOR

BACKGROUND OF THE INVENTION

The present invention relates to a projection lens system for projecting images, and more particularly to a projection lens system for a video projector which combines images displayed on a plurality of monochrome cathode ray tubes, and then enlarges and projects the combined images on a large screen.

A general cathode ray tube (CRT) for televisions is the most well-known image display apparatus. If the television CRT is a direct-viewing type, a thirty-inch screen is generally the practical limit for the screen size. Beyond these dimensions, the screen's luminance and contrast are lowered, and resolution is degraded. Moreover, there are other technical limitations which limit the size of a CRT.

However, for an image projection apparatus which employs a projection lens, such technical limitations of the CRT can be overcome by performing such operations as aberration correction of the projection lens. Accordingly, larger images of a better picture quality can be displayed. Such an image projection apparatus has already been employed in a projection TV, video projector, etc. In the future, image projection apparatuses will be extended to computer peripheral apparatuses, video conference systems, and other similar applications.

Generally, an image projection apparatus includes a combination of projection type CRTs and lens components for enlarging and projecting images generated from projection type CRTs. Also, to project color images, three monochrome CRTs of red, green and blue are used. In this case, there are two different types, according to the disposition of the CRTs.

One of these two types is a triple-CRT triple-lens system which is a combination of three monochrome CRTs and three lens units whose respective optical axes are arranged to face the center of a screen. However, since the location for each of the CRTs and lens units, needs to be adjusted adjusting the focus and magnitude of the image displayed on the screen is difficult.

The other of the two types is a triple-CRT single-lens system which is a combination of three monochrome CRTs (red, green and blue) arranged in a T-shaped array and having two dichroic mirrors which are arranged in an X-shaped array at the point where the respective optical axes intersect, and a single lens unit which is positioned in front of the mirrors for enlarging and projecting a color image to the screen. In this type of system, the screen control is easier and the structure is simpler than those of the above system. However, if a 5-inch CRT is used in this type of system, since the CRTs are spaced apart from the single lens unit by about 130–150 mm, aberration occurs and an adequate quantity of peripheral light is difficult to secure. In order to overcome such difficulties, a large-diameter lens or a CRT with a concave image-generating surface has been used. However, the large lens increases the dimension of the apparatus, and the concave image-generating surface makes CRT manufacturing quite complicated.

Accordingly, in the triple-CRT single-lens system, it is desirable to attain both a large aperture with a small lens and flatness of the CRT's image-generating surface.

On the other hand, the CRT used in the image projection apparatus is usually smaller than the general type. Thus, a temperature rise results from the high-power electron beams being concentrated on the small image-generating surface. This may not only change the light emitting characteristic of the fluorescent material on the image-generating surface, but also may damage the glass surface. Therefore, the cooling structure must be considered in view of the thermal characteristics of the CRT.

As an example of a conventional triple-CRT single-lens system, U.S. Pat. No. 4,764,806 describes a structure wherein a plano-convex lens having the same radius of curvature as that of the concave image-generating surface of a CRT is used. Here, the lens and CRT peripheries are tightly sealed, so that the space thereby formed can be filled with an oil having the same refractive index as that of the face glass of the CRT therein, so as to remove optical aberrations such as spherical aberration, coma aberration, etc. Also, according to U.S. Pat. No. 4,842,394 optical aberration can be eliminated by means of two spherical lenses and an aspherical lens.

However, difficulty still exists in the manufacture of the CRTs of the above U.S. Patents since the lenses employed are designed on the basis of the concave image-generating surface of the CRT. In addition, even though the above-mentioned oil serves as a CRT coolant, such a structure is unfavorable to CRT control for display adjustments.

SUMMARY OF THE INVENTION

Therefore, it is an object of the present invention to provide a projection lens system for a video projector wherein a planar image-generating surface of a CRT is contrived, and, at the same time, optical aberration is eliminated by accomplishing a large lens aperture.

It is another object of the present invention to provide a projection lens system for a video projector which can facilitate user-controlled display adjustments and cool the CRT effectively.

To accomplish the objects of the present invention, there is provided a projection lens system for a video projector which uses image-combining means to combine images respectively generated from a plurality of image-generating surfaces by means of an image-combining means, and enlarges and projects the combined image to a screen, comprising a plurality of lenses, at least one of which is disposed between the image-generating surface and the image-combining means so as to transmit the image generated from the image-generating surface to the image-combining means.

Furthermore, in the present invention, an oil chamber is provided by sealing the edges of one lens element and its image-generating surface, and filling it with cooling oil for cooling the image-generating surface.

BRIEF DESCRIPTION OF THE DRAWINGS

The above objects and other advantages of the present invention will become more apparent by describing in detail a preferred embodiment of the present invention with reference to the attached drawings in which:

FIGS. 2A through 2D are aberration graphs using data shown in Table 1, wherein

FIGS. 3A through 3D are aberration graphs using data shown in Table 2, wherein

FIGS. 4A through 4D are aberration graphs using data shown in Table 3, wherein

FIGS. 5A through 5D are aberration graphs using data shown in Table 4, wherein FIGS. 6A through 6D are aberration graphs using data shown in Table 5, wherein

DETAILED DESCRIPTION OF THE INVENTION

Figure 1:
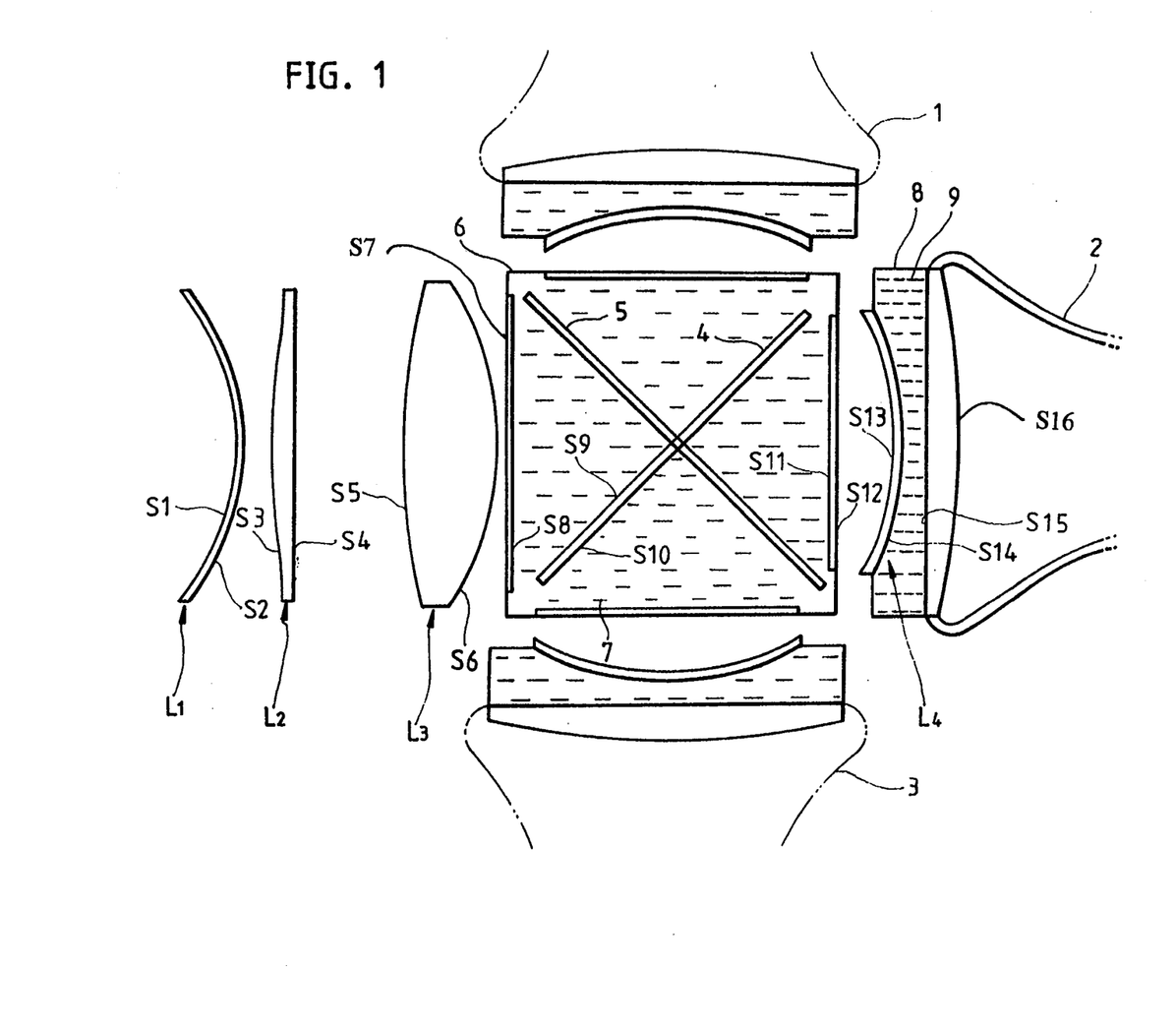
FIG. 1 shows an arrangement of lenses for illustrating the optical construction of a projection lens system for a video projector according to the present invention.
Figure 2A:
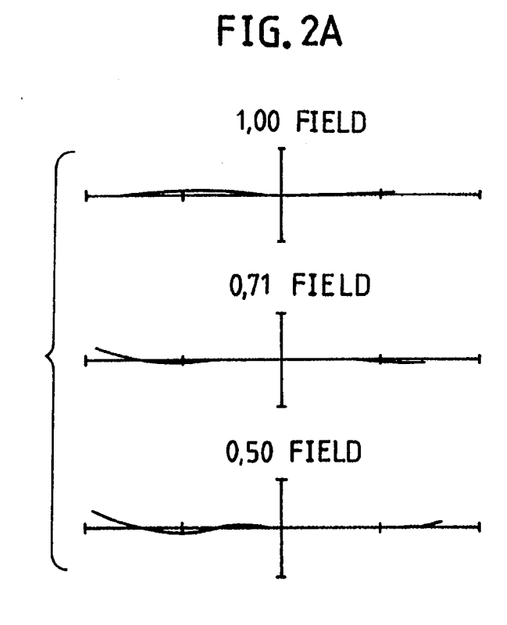
FIG. 2A shows the field curvature in the meridional direction.
Figure 2B:
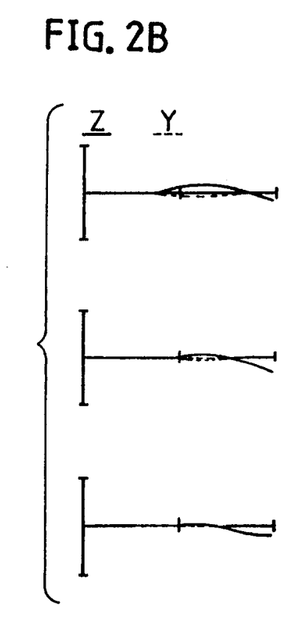
FIG. 2B shows the field curvature in the sagittal direction.
Figure 2C:
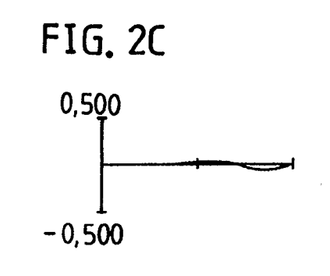
FIG. 2C shows spherical aberration.
Figure 2D:
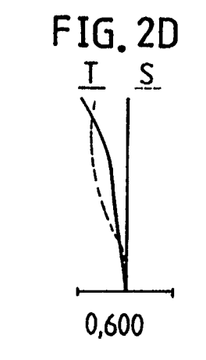
FIG. 2D shows distortion.
Figure 3A:
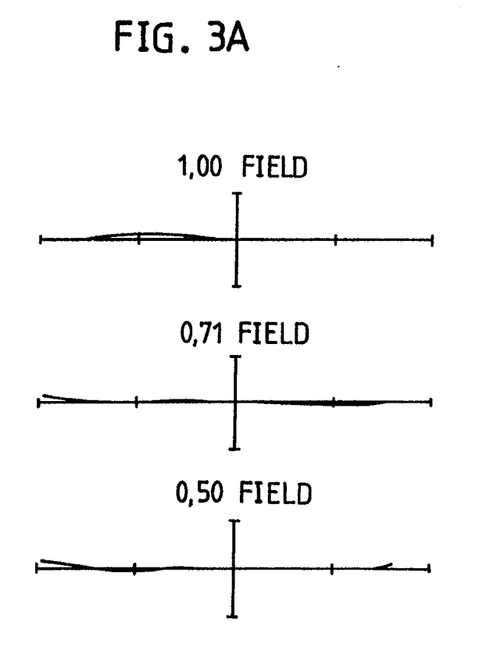
FIG. 3A shows the field curvature in the meridional direction.
Figure 3B:
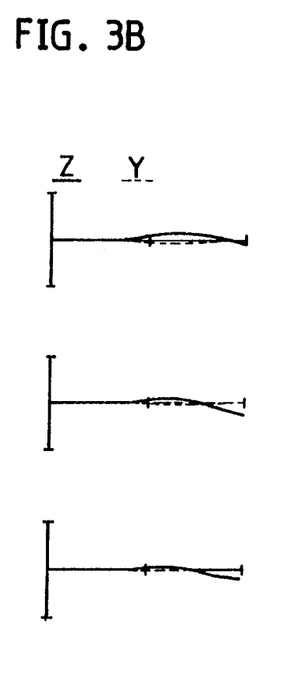
FIG. 3B shows the field curvature in the sagittal direction.
Figure 3C:
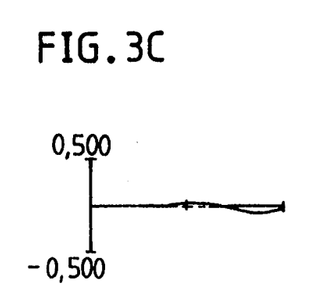
FIG. 3C shows spherical aberration.
Figure 3D:
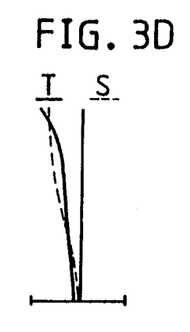
FIG. 3D shows distortion.
Figure 4A:
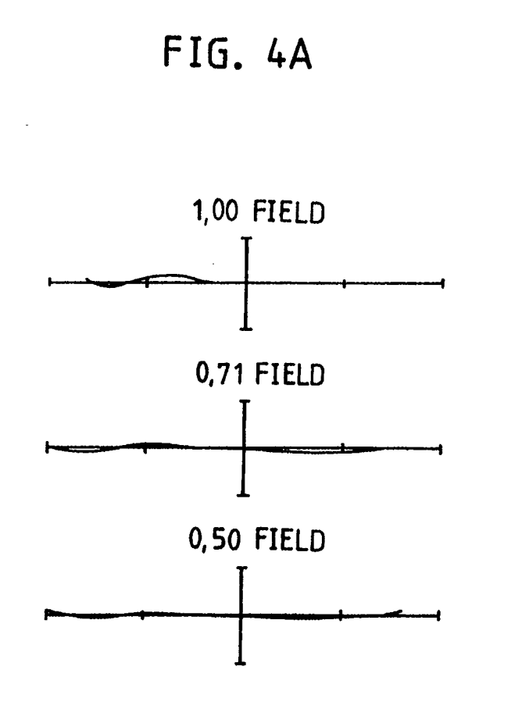
FIG. 4A shows the field curvature in the meridional direction.
Figure 4B:
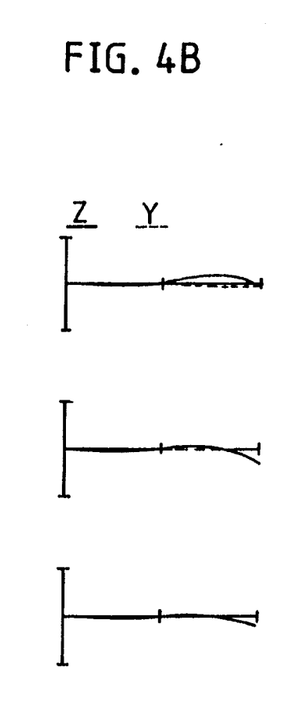
FIG. 4B shows the field curvature in the sagittal direction.
Figure 4C:
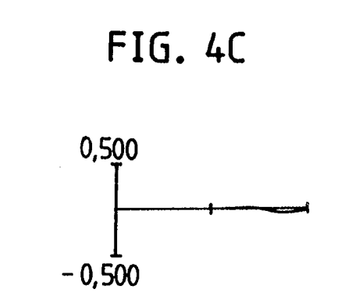
FIG. 4C shows spherical aberration.
Figure 4D:
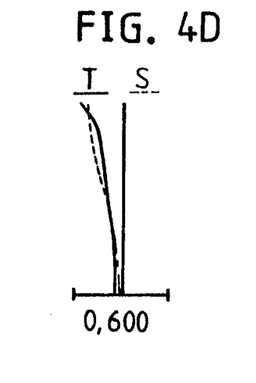
FIG. 4D shows distortion.
Figure 5A:
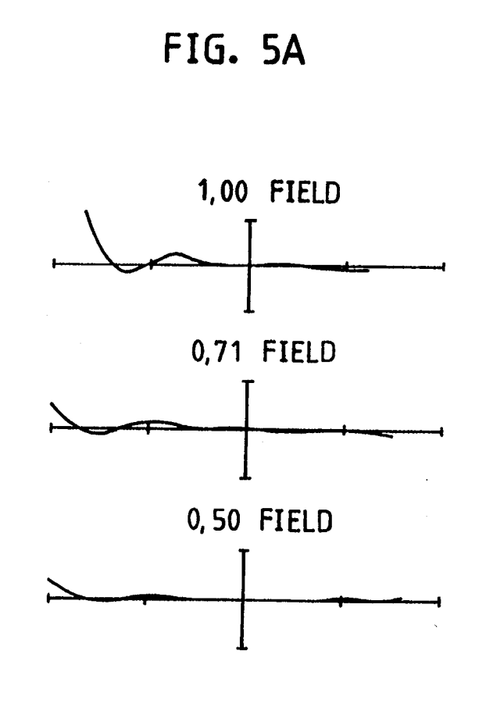
FIG. 5A shows the field curvature in the meridional direction.
Figure 5B:
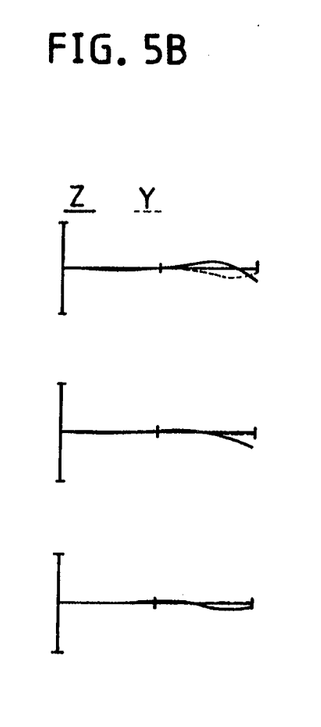
FIG. 5B shows the field curvature in the sagittal direction.
Figure 5C:
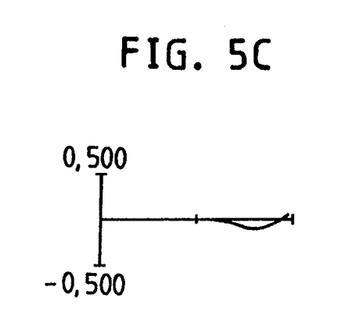
FIG. 5C shows spherical aberration.
Figure 5D:
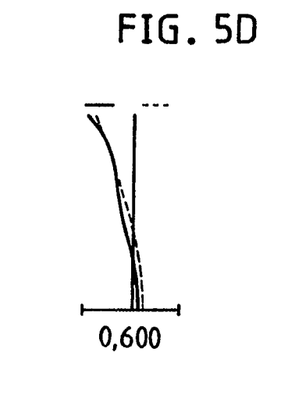
FIG. 5D shows distortion.
Figure 6A:
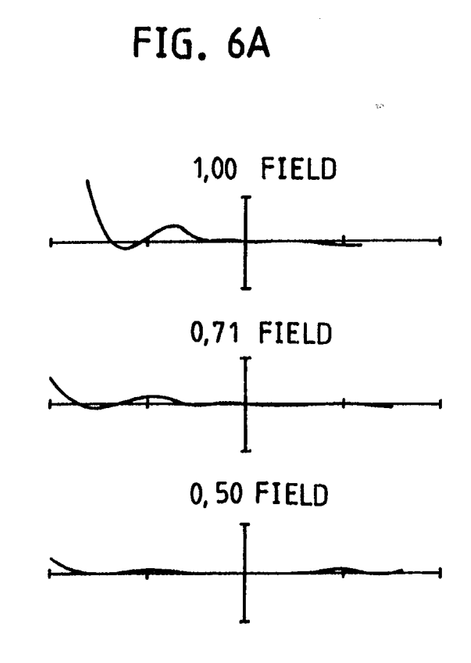
FIG. 6A shows the field curvature in the meridional direction, FIG. 6B show the field curvature in the sagittal direction.
Figure 6B:
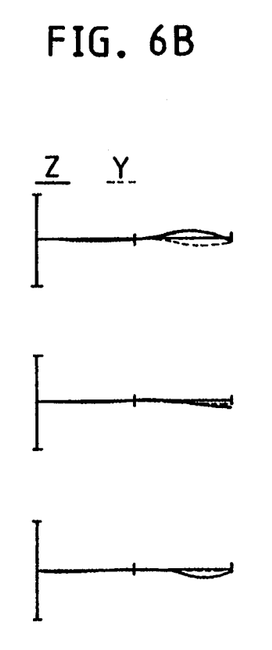
Figure 6C:
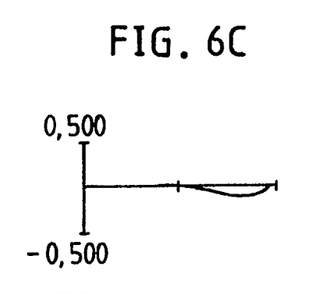
FIG. 6C shows spherical aberration.
Figure 6D:
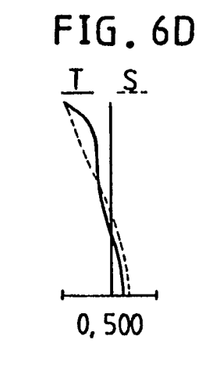
FIG. 6D shows distortion.

In the embodiment of the present invention shown in FIG. 1, three monochrome CRTs 1, 2 and 3 each having an image-generating surface $S_{15}$ are disposed in a T-shaped array. Here, a central CRT 2 generates a green image, whose optical axis is coincident with the center of the forward screen (not shown), and side CRTs 1 and 3 generate red and blue images, respectively, and oppose each other so that both their optical axes intersect the same point on the optical axis of central CRT 2.

The image combining unit for combining the red, green and blue images at the same optical axis includes two dichroic mirrors 4 and 5 which are disposed in an X-shaped array at the point where the optical axes of CRTs 1, 2 and 3 intersect, and a fluid chamber 6 which houses the dichroic mirrors 4 and 5, wherein a fluid 7 fills the interior thereof, and whose four sides are provided with windows 6a, 6b, 6c and 6d. The dichroic mirrors 4 and 5 transmit the green image generated by the central CRT 2, and the red and blue images which are generated by the side CRTs 1 and 3 are reflected so that the reflected images are combined on the coincident optical axis. Here, considering the refractive index of the dichroic mirrors 4 and 5, a mineral oil having a refractive index of 1.4–1.5 and which exhibits an excellent optical performance is used as the fluid 7 filling the fluid chamber 6.

The projection lens system according to the present invention includes four lenses. One lens $L_4$ of the four lenses is placed between the image-generating surfaces $S_{15}$ of the CRTs for generating images and the dichroic mirrors 4 and 5 which combine the images. The remaining first, second and third lenses $L_1$, $L_2$ and $L_3$ are sequentially arranged in front of the dichroic mirrors 4 and 5 as shown in FIG. 1.

The first lens $L_1$ is a plastic (PMMA) concavo-convex aspherical lens having a concave frontal surface $S_1$ and convex rear surface $S_2$, whose power is negative. The second lens $L_2$ is a plastic (PMMA) biconvex lens having convex front and rear surfaces $S_3$ and $S_4$, whose power is positive. The third lens $L_3$ is a glass ($BK_7$) biconvex lens having bulging front and rear surfaces $S_5$ and $S_6$, whose power is positive.

Among these, the first and second lenses $L_1$, and $L_2$, are provided for correcting only spherical and coma aberrations, astigmatism, etc., without optical power. The third lens $L_3$ serves as the main optical power of the overall system, and corrects the change in focal length caused by temperature variation. With respect to the first and second lenses $L_1$ and $L_2$, the ratio of the center thicknesses to the edge thicknesses of their optical axes does not exceed 10%, considering the lens variation at the time of injection molding.

Also, fourth lens $L_4$ is designed to allow its front surface $S_{13}$ to be aspherical so as to correct the field curvature of image-generating surface $S_{16}$ of the CRT, and is a plastic concavo-convex aspheric lens with an optically negative power. This lens is disposed in front of each CRT (1, 2 and 3).

On the other hand, a chamber 8 is provided for sealing a space formed by fourth lens $L_4$ and the front surface of each of the CRTs (1, 2 and 3), and is filled with cooling oil 9. Here, cooling oil 9 is colorless and transparent.

The above lenses satisfy the following inequalities:

$$8 < \frac{f_1}{f} < 10,$$

$$1.5 < \frac{f_2}{f} < 3,$$

$$1.1 < \frac{f_3}{f} < 1.2$$

and $$2 < \frac{f_4}{f} < 4,$$

where "f" is the focal length of the overall optical system, and $f_1$, $f_2$, $f_3$ and $f_4$ are the respective focal lengths of the lenses $L_1$, $L_2$, $L_3$ and $L_4$.

The following Tables 1 to 5 represent the experimental data with respect to the optical systems of the present invention.

TABLE 1

| surface no. | curvature radius (mm) | distance (mm) | refractive index | effective radius (mm) |
| --- | --- | --- | --- | --- |
| screen A | ∞ | 1931.0 | air | 762 |
| screen B | ∞ | 2455.0 | air | 967 |
| screen C | ∞ | 3218.0 | air | 1270 |
| $S_1$ (ASP) | −81.91 | 3.02 | 1.492 | 63 |
| $S_2$ (ASP) | −93.42 | 11.12 | air | 63 |
| $S_3$ (ASP) | 261.03 | 9.98 | 1.492 | 63 |
| $S_4$ (ASP) | −697.7 | 42.603 | air | 63 |
| $S_5$ | 322.993 | 36.2 | 1.517 | 66 |
| $S_6$ | −124.77 | 7.147(A) 4.993(B) | air | 66 |

TABLE 1-continued

| | | | | |
|---|---|---|---|---|
| | | 3.027(C) | | |
| $S_7$ | ∞ | 3.0 | 1.517 | 60 |
| $S_8$ | ∞ | 62.5 | 1.52 | 60 |
| $S_9$ | ∞ | 3.0 | 1.517 | 80 |
| $S_{10}$ | ∞ | 62.5 | 1.517 | 80 |
| $S_{11}$ | ∞ | 3.0 | 1.52 | 51 |
| $S_{12}$ | ∞ | 22.92 | air | 51 |
| $S_{13}$ (ASP) | −127.092 | 3.00 | 1.492 | 52 |
| $S_{14}$ | −127.0 | 10.0 | 1.46 | 52 |
| $S_{15}$ | ∞ | 13.1 | 1.552 | |
| $S_{16}$ | −350.0 | | | | aspheric surface
CC = 0

| | D | E | F | G |
|---|---|---|---|---|
| $S_1$ | $0.1889584 \times 10^{-6}$ | $0.1087528 \times 10^{-9}$ | $-0.1064918 \times 10^{-13}$ | $-0.1049388 \times 10^{-17}$ |
| $S_2$ | $-0.7169636 \times 10^{-7}$ | $0.1339898 \times 10^{-9}$ | $-0.1704334 \times 10^{-13}$ | $-0.7928137 \times 10^{-18}$ |
| $S_3$ | $-0.6261014 \times 10^{-7}$ | $-0.3464453 \times 10^{-10}$ | $-0.5668808 \times 10^{-14}$ | $0.6676048 \times 10^{-18}$ |
| $S_4$ | $0.3341921 \times 10^{-6}$ | $-0.6798124 \times 10^{-10}$ | $0.1317012 \times 10^{-14}$ | $0.9210892 \times 10^{-18}$ |
| $S_{13}$ | $-0.5660188 \times 10^{-6}$ | $0.2970666 \times 10^{-10}$ | $0.2412300 \times 10^{-13}$ | $-0.5318665 \times 10^{-17}$ |

TABLE 2

| surface no. | curvature radius (mm) | distance (mm) | refractive index | effective radius (mm) |
|---|---|---|---|---|
| screen A | ∞ | 1931.0 | air | 762 |
| screen B | ∞ | 2455.0 | air | 967 |
| screen C | ∞ | 3218.0 | air | 1270 |
| $S_1$ (ASP) | −80.65 | 3.5904 | 1.492 | 63 |
| $S_2$ (ASP) | −91.914 | 8.5439 | air | 63 |
| $S_3$ (ASP) | 276.5648 | 11.556 | 1.492 | 63 |
| $S_4$ (ASP) | −635.0145 | 36.8876 | air | 63 |
| $S_5$ | 345.5651 | 44.0447 | 1.517 | 66 |
| $S_6$ | −121.03 | 7.147(A) | air | 66 |
| | | 4.993(B) | | |
| | | 3.027(C) | | |
| $S_7$ | ∞ | 3.0 | 1.517 | 60 |
| $S_8$ | ∞ | 62.5 | 1.52 | 60 |
| $S_9$ | ∞ | 3.0 | 1.517 | 80 |
| $S_{10}$ | ∞ | 62.5 | 1.52 | 80 |
| $S_{11}$ | ∞ | 3.0 | 1.517 | 51 |
| $S_{12}$ | ∞ | 22.92 | air | 51 |
| $S_{13}$ (ASP) | −114.6625 | 3.0 | 1.492 | 52 |
| $S_{14}$ | −127.0 | 10.0 | 1.46 | 52 |
| $S_{15}$ | ∞ | 13.1 | 1.552 | |
| $S_{16}$ | −350.0 | | | | aspheric surface
CC = 0

| | D | E | F | G |
|---|---|---|---|---|
| $S_1$ | $0.1967811 \times 10^{-6}$ | $0.1090912 \times 10^{-9}$ | $-0.1093412 \times 10^{-13}$ | $-0.0493388 \times 10^{-17}$ |
| $S_2$ | $-0.7774437 \times 10^{-7}$ | $0.1331830 \times 10^{-9}$ | $-0.1705348 \times 10^{-13}$ | $-0.8408269 \times 10^{-18}$ |
| $S_3$ | $-0.7434160 \times 10^{-7}$ | $-0.3359795 \times 10^{-10}$ | $-0.5505747 \times 10^{-14}$ | $0.6606658 \times 10^{-18}$ |
| $S_4$ | $0.3412096 \times 10^{-6}$ | $-0.6744482 \times 10^{-10}$ | $0.1277373 \times 10^{-14}$ | $0.1013331 \times 10^{-18}$ |
| $S_{13}$ | $-0.2970721 \times 10^{-6}$ | $0.2000083 \times 10^{-10}$ | $0.9341635 \times 10^{-14}$ | $-0.2326165 \times 10^{-17}$ |

TABLE 3

| surface no. | curvature radius (mm) | distance (mm) | refractive index | effective radius (mm) |
|---|---|---|---|---|
| screen A | ∞ | 1931.0 | air | 762 |
| screen B | ∞ | 2455.0 | air | 967 |
| screen C | ∞ | 3218.0 | air | 1270 |
| $S_1$ (ASP) | −77.7683 | 2.8881 | 1.492 | 63 |
| $S_2$ (ASP) | −88.743 | 7.8278 | air | 63 |
| $S_3$ (ASP) | 313.1452 | 10.3559 | 1.492 | 63 |
| $S_4$ (ASP) | −527.6117 | 35.0346 | air | 63 |
| $S_5$ | 332.6338 | 47.1348 | 1.517 | 66 |
| $S_6$ | −119.5187 | 7.1541(A) | air | 66 |
| | | 4.993(B) | | |
| | | 3.027(C) | | |
| $S_7$ | ∞ | 3.0 | 1.517 | 60 |
| $S_8$ | ∞ | 62.5 | 1.52 | 60 |
| $S_9$ | ∞ | 3.0 | 1.517 | 80 |
| $S_{10}$ | ∞ | 62.5 | 1.52 | 80 |
| $S_{11}$ | ∞ | 3.0 | 1.517 | 51 |
| $S_{12}$ | ∞ | 22.92 | air | 51 |
| $S_{13}$ (ASP) | −110.4188 | 3.00 | 1.492 | 52 |
| $S_{14}$ | −112.0 | 10.0 | 1.46 | 52 |
| $S_{15}$ | ∞ | 13.1 | 1.552 | |

TABLE 3-continued

| | | | | |
|---|---|---|---|---|
| $S_{16}$ | −350.0 | | | |

| | aspheric surface $CC = 0$ | | | |
|---|---|---|---|---|
| | D | E | F | G |
| $S_1$ | $0.2238300 \times 10^{-6}$ | $0.1082495 \times 10^{-9}$ | $-0.1262105 \times 10^{-13}$ | $-0.9523967 \times 10^{-17}$ |
| $S_2$ | $-0.8775287 \times 10^{-7}$ | $0.1318022 \times 10^{-9}$ | $-0.1679014 \times 10^{-13}$ | $-0.1231923 \times 10^{-18}$ |
| $S_3$ | $-0.9190367 \times 10^{-7}$ | $-0.2784967 \times 10^{-10}$ | $-0.5087051 \times 10^{-14}$ | $0.9527710 \times 10^{-18}$ |
| $S_4$ | $0.3564866 \times 10^{-6}$ | $-0.6531641 \times 10^{-10}$ | $0.2442223 \times 10^{-14}$ | $0.1256228 \times 10^{-18}$ |
| $S_{13}$ | $-0.2598791 \times 10^{-6}$ | $0.6737155 \times 10^{-10}$ | $0.1602601 \times 10^{-14}$ | $-0.1425924 \times 10^{-17}$ |

TABLE 4

| surface no. | curvature radius (mm) | distance (mm) | refractive index | effective radius (mm) |
|---|---|---|---|---|
| screen A | ∞ | 1931.0 | air | 762 |
| screen B | ∞ | 2455.0 | air | 967 |
| screen C | ∞ | 3218.0 | air | 1270 |
| $S_1$ (ASP) | −79.5639 | 2.7212 | 1.492 | 63 |
| $S_2$ (ASP) | −90.581 | 2.7794 | air | 63 |
| $S_3$ (ASP) | 317.6481 | 14.9952 | 1.492 | 63 |
| $S_4$ (ASP) | −464.7183 | 36.0197 | air | 63 |
| $S_5$ | 360.55 | 39.99 | 1.517 | 66 |
| $S_6$ | −116.2787 | 7.1374(A) 4.993(B) 3.027(C) | air | 66 |
| $S_7$ | ∞ | 3.0 | 1.517 | 60 |
| $S_8$ | ∞ | 62.5 | 1.52 | 60 |
| $S_9$ | ∞ | 3.0 | 1.517 | 80 |
| $S_{10}$ | ∞ | 62.5 | 1.52 | 80 |
| $S_{11}$ | ∞ | 3.0 | 1.517 | 51 |
| $S_{12}$ | ∞ | 22.92 | air | 51 |
| $S_{13}$ (ASP) | −102.8041 | 3.0 | 1.517 | 52 |
| $S_{14}$ | −103.8772 | 10.0 | 1.46 | 52 |
| $S_{15}$ | ∞ | 13.1 | 1.552 | |
| $S_{16}$ | −350.0 | | | |

| | aspheric surface $CC = 0$ | | | |
|---|---|---|---|---|
| | D | E | F | G |
| $S_1$ | $0.2284070 \times 10^{-6}$ | $0.1078838 \times 10^{-9}$ | $-0.1138797 \times 10^{-13}$ | $-0.1006652 \times 10^{-17}$ |
| $S_2$ | $-0.8754498 \times 10^{-7}$ | $0.1319262 \times 10^{-9}$ | $-0.1661595 \times 10^{-13}$ | $-0.1283522 \times 10^{-18}$ |
| $S_3$ | $-0.1100573 \times 10^{-7}$ | $-0.2698796 \times 10^{-10}$ | $-0.5420102 \times 10^{-14}$ | $0.6760534 \times 10^{-18}$ |
| $S_4$ | $0.3721791 \times 10^{-6}$ | $-0.6657895 \times 10^{-10}$ | $0.1999971 \times 10^{-14}$ | $0.1215209 \times 10^{-18}$ |

TABLE 5

| surface no. | curvature radius (mm) | distance (mm) | refractive index | effective radius (mm) |
|---|---|---|---|---|
| screen A | ∞ | 1931.0 | air | 762 |
| screen B | ∞ | 2455.0 | air | 967 |
| screen C | ∞ | 3218.0 | air | 1270 |
| $S_1$ (ASP) | −77.5288 | 3.9610 | 1.492 | 63 |
| $S_2$ (ASP) | −92.0162 | 0.1126 | air | 63 |
| $S_3$ (ASP) | 332.6896 | 14.9952 | 1.492 | 63 |
| $S_4$ (ASP) | −307.0055 | 38.62 | air | 63 |
| $S_5$ | 510.5802 | 39.9935 | 1.517 | 66 |
| $S_6$ | −114.7937 | 7.1972(A) 4.993(B) 3.027(C) | air | 66 |
| $S_7$ | ∞ | 3.0 | 1.517 | 60 |
| $S_8$ | ∞ | 62.5 | 1.52 | 60 |
| $S_9$ | ∞ | 3.0 | 1.517 | 80 |
| $S_{10}$ | ∞ | 62.5 | 1.52 | 80 |
| $S_{11}$ | ∞ | 3.0 | 1.517 | 51 |
| $S_{12}$ | ∞ | 22.92 | air | 51 |
| $S_{13}$ | −116.0 | 3.00 | 1.517 | 52 |
| $S_{14}$ | ∞ | 10.0 | 1.46 | 52 |
| $S_{15}$ | ∞ | 13.1 | 1.552 | |
| $S_{16}$ | −350.0 | | | |

| | aspheric surface $CC = 0$ | | | |
|---|---|---|---|---|
| | D | E | F | G |
| $S_1$ | $0.3080922 \times 10^{-6}$ | $0.1218993 \times 10^{-9}$ | $-0.1384528 \times 10^{-13}$ | $-0.1378738 \times 10^{-17}$ |
| $S_2$ | $-0.6176719 \times 10^{-7}$ | $0.1344672 \times 10^{-9}$ | $-0.1617266 \times 10^{-13}$ | $-0.1828065 \times 10^{-18}$ |
| $S_3$ | $-0.1266378 \times 10^{-7}$ | $-0.2381814 \times 10^{-10}$ | $-0.7815357 \times 10^{-14}$ | $0.3812001 \times 10^{-18}$ |
| $S_4$ | $0.5028396 \times 10^{-6}$ | $-0.6365232 \times 10^{-10}$ | $0.1370527 \times 10^{-14}$ | $0.1146621 \times 10^{-18}$ |

In the foregoing Tables, screens A, B and C represent the use of a 60-inch, 80-inch and 100-inch screen, respectively. The distance is the optical distance between the surface (Si, where i=1,2, . . . ) corresponding to each lens element and the next surface ($S_{i+1}$), wherein the distance to rear surface $S_{13}$ of the fourth lens especially differs according to screens A, B and C.

Also, "ASP" mean that the corresponding surface (Si) is aspherical, and the aspheric surface satisfies the following equations:

$$X = \frac{\rho}{\gamma} \cdot \frac{1}{1 + \sqrt{1 - (CC + 1)(\rho/\gamma)^2}} + D\rho^4 + E\rho^6 + F\rho^8 + G\rho^{10}$$

and $$\rho^2 = Y^2 + Z^2$$

where X indicates the projecting amount in the direction to the optical axis, $\gamma$ is the curvature radius of the reference spherical surface, $\rho$ is the height from the optical axis, CC is a conic constant, and D, E, F and G are coefficients of the respective aspherical surfaces.

FIGS. 2 through 6 are graphs resulting from the data shown in Tables 1 to 5, respectively. Here, the X-axis of the coordinates is based on an entrance pupil of one.

In the above-described embodiments, by means of each fourth lens $L_4$, each red, green and blue image formed by the three CRTs is free from aberration which is caused by field curvature, is transmitted to dichroic mirrors 4 and 5 within the fluid box 6, and thus combined as one color image without aberration. At this time, the fluid 7 which has a similar refractive index to the dichroic mirrors 4 and 5, enhances the axial performance of the combined image. The color image is enlarged and projected forward by the third lens $L_3$ which has an optical power, and its coma aberration is corrected by the first and second lenses $L_1$ and $L_2$, thereby focusing on an unknown screen in front of them. With respect to the images projected on the screen, chromatic aberration is corrected by forward and backward movement of the respective CRTs, and the problem of the dimming of the image is solved by adjusting the tilt of the CRTs. Also, the focusing adjustment is implemented by jointly moving the first, second and third lenses as one in the optical direction.

According to the above-described embodiments, since aberration of the field curvature due to the image-generating surface is corrected by using the fourth lens, the radius of curvature of the image-generating surface can be enlarged. That is, the radius of curvature of the concave image-generating surface is enlarged and nearly flattened in the present invention, which solves the problem of complicated CRT manufacturing. In addition to this, other lenses for enlarging and projecting the images correct coma aberration only, so that miniaturization of the apparatus can be achieved by decreasing the required number of lenses and realizing a large aperture with a small diameter and a large viewing angle.

Furthermore, the present invention provides an oil chamber by sealing the edges of the fourth lens disposed in front of each CRT and the face glass of the CRT, so that each CRT is cooled, which enhances cooling efficiency. Moreover, respective CRTs can be easily moved to correct chromatic aberration.

What is claimed is:

1. A projection lens system for a video projector, comprising a plurality of image-generating surfaces for respectively generating a plurality of images, image-combining means, including a fluid chamber which is filled with a fluid having a refractive index within a predetermined range, for combining said images respectively generated from said plurality of image-generating surfaces to form a combined image, and for enlarging and projecting the combined image to a screen, a plurality of lenses at least one of which being disposed between said image-generating surfaces and said image-combining means so as to transmit said images generated from said image-generating surfaces to image-combining means, and an oil chamber provided by sealing the edges of said at least one lens and said image-generating surface and being filled with cooling oil for cooling the corresponding image-generating surface, said fluid and said cooling oil being different liquids, wherein said plurality of lenses comprises first and second lenses having front and rear surfaces that are aspherical for correcting coma aberration; a third lens for serving as the main optical power of said video projector, and correcting changes of focal length of said projection lens system caused by temperature variation; and a fourth lens disposed between said image-generating surface and said image-combining means, for correcting field curvature aberration of said image generating surface, thereby satisfying the following inequations:

$$8 < \frac{f_1}{f} < 10,$$

$$1.5 < \frac{f_2}{f} < 3,$$

$$1.1 < \frac{f_3}{f} < 1.2$$

and $$2 < \frac{f_4}{f} < 4,$$

where "f" is the focal length of the overall optical system, and $f_1$, $f_2$, $f_3$ and $f_4$ are respective focal lengths of said lenses.

2. A projection lens system comprising:
a plurality of image-generating devices each generating an image;
an image-combiner for combining the images generated by each of said plurality of image-generating devices so as to form a combined image, said image-combiner including a fluid chamber which is filled with a fluid, and two dichroic mirrors, disposed within said fluid chamber, and arranged in an X-shaped array;
a first optical lens system, disposed between said plurality of image-generating devices and said image-combiner, for transmitting the image generated by each of said image-generating devices to said image-combiner; and
a second optical lens system for focusing said combined image from said image-combiner onto a predetermined surface, wherein each of said image-generating devices has an image-generating surface and wherein said first optical lens system comprises a plurality of lenses, each of the lenses being disposed between a different one of said image-generating surfaces and said image-combiner, for correcting respective field curvature aberrations of said image-generating surfaces, wherein an oil chamber is formed between each of said lenses and respective image-generating surfaces, each of said oil chambers being formed with cooling oil for cooling the corresponding image-generating surface, said fluid and said oil being different liquids, wherein said second optical lens system comprises first and second lenses each having front and rear surfaces that are aspherical for correcting coma aberration, and a third lens for serving as the main optical power of the projection lens system.

3. A projection lens system as defined in claim 2, wherein said first lens is a plastic concavo-convex aspherical lens having a concave frontal surface and a convex rear surface with negative power, said second lens is a plastic bioconvex lens having convex front and rear surfaces with positive power, and said third lens is a glass biconvex lens having bulging front and rear surfaces with positive power.

4. A projection lens system as defined in claim 2, wherein said third lens corrects changes in focal length of said projection lens system caused by temperature variation of the projection lens system.

* * * * *